US009426290B2

(12) United States Patent
Perler et al.

(10) Patent No.: US 9,426,290 B2
(45) Date of Patent: *Aug. 23, 2016

(54) MULTILEVEL DIRECTORY ASSISTANCE APPARATUS AND METHOD

(71) Applicants: Robert F. Perler, New Rochelle, NY (US); Craig Perler, Larchmont, NY (US)

(72) Inventors: Robert F. Perler, New Rochelle, NY (US); Craig Perler, Larchmont, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 14/215,035

(22) Filed: Mar. 16, 2014

(65) Prior Publication Data

US 2014/0233718 A1 Aug. 21, 2014

Related U.S. Application Data

(62) Division of application No. 13/004,143, filed on Jan. 11, 2011, now Pat. No. 8,712,024.

(51) Int. Cl.
*H04M 3/42* (2006.01)
*H04M 3/493* (2006.01)
*H04M 15/06* (2006.01)
*H04M 15/08* (2006.01)
*G06F 3/0484* (2013.01)

(52) U.S. Cl.
CPC ......... *H04M 3/4931* (2013.01); *G06F 3/04842* (2013.01); *H04M 3/4935* (2013.01); *H04M 15/06* (2013.01); *H04M 15/08* (2013.01); *H04M 2215/0192* (2013.01)

(58) Field of Classification Search
USPC .................. 379/142.06, 114.29, 122, 142.17, 379/93.17, 100.14, 280, 201.04, 433.06, 379/218.01
See application file for complete search history.

(56) References Cited

U.S. PATENT DOCUMENTS

| 6,252,597 B1* | 6/2001 | Lokuge | G06F 3/0481 715/841 |
| 6,584,185 B1* | 6/2003 | Nixon | H04M 3/42314 379/201.01 |
| 2005/0232210 A1* | 10/2005 | Karaoguz et al. | 370/338 |
| 2007/0263791 A1* | 11/2007 | Alperin | H04M 3/436 379/67.1 |
| 2012/0215783 A1* | 8/2012 | Musgrove et al. | 707/740 |

* cited by examiner

*Primary Examiner* — Yosef K Laekemariam
(74) *Attorney, Agent, or Firm* — Handal & Morofsky LLC

(57) ABSTRACT

A method is disclosed for the presentation of telephone information about a company or other enterprise over the Internet in response to consumer searches for names or products. Department information is included. The system uses a database to determine product slightly sold my search for companies to provide advertisers or sponsors with preferential placement of their ads. Revenue is charged response to clicking on an advertisement. The system also places telephone calls over the Internet to users of the inventive search engine. Advertisers are charged for such calls. Optionally, the system may not allow direct dialing for non-advertisers.

15 Claims, 11 Drawing Sheets

Figure 14

Shoe Inn
Shoes
333 333-3333

Leo's
Salumeria
333 333-3333 — 522

7 -11
Lobster $5.95/lb.
333 333-3333

Frank's Barber
Shop
444 444-4444

MULTILEVEL DIRECTORY ASSISTANCE APPARATUS AND METHOD

TECHNICAL FIELD

The invention relates to apparatus for providing telephone number directory assistance and methods for implementing the same, for example on a publicly accessible electronic communications network, such as the Internet.

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The invention is concerned with dealing with the common problem of initiating a voice connection with the right department of an enterprise, such as a retail department store. These days, live operators have largely been replaced by prerecorded directory trees which present the potential consumer with a great amount of inconvenience. Nevertheless, such directory trees are in increasingly common use.

SUMMARY OF THE INVENTION

The inventive method provides for the display of a directory of information elements, comprising displaying said . . . directory of information elements with a configuration which is humanly perceptible but with a size that may not be humanly discernible. The elements are divided into at least first, second and third tiers of information. The first, second and third tiers of information are displayed simultaneously. The first tier of information is displayed in a first size. The second tier of information is displayed in a second size smaller than said first size, and said third tier of information does displayed in a third size smaller than said second size. The information elements each comprise an identification subelement and an address subelement. A user may drag the display to reveal other parts of the display.

In accordance with the invention, a method for providing telephone directory assistance from a database containing a plurality of telephone numbers and respective party identification data associated with each of the telephone numbers is achieved. Generally, a user enters name of any product or goods desired and/or the name of a supplier of the same and is presented with telephone contact information. This is done through a number of steps starting with, for example, a screen display which is presented on a computer monitor. The screen display comprises a called party field for the entry of called party identification data. A called party activation element associated with the called party field is presented. An entry of called party identification data is received by the inventive system. The actuation of the called party activation element is received by the system. The respective party identification data is searched for a match or matches to the received called party identification data. The matched party identification data is displayed together with its associated respective telephone number. A plurality of elements communicating associated party identification data associated with the matched party identification data are displayed. The associated party identification data is presented in a manner that indicates the association, for example by physical proximity, color coding, subpositioning with indentation, or lines.

A selection of one of the plurality of elements communicating associated party identification data may be made. For the selected one of the plurality of elements communicating associated party identification data, one or a plurality of subelements communicating associated subparty identification data may be displayed. The associated subparty identification data may be presented in a manner that indicates the association.

A request may be received from a user to dial a selected one of the matched subparty telephone numbers. The selected one of the matched subparty telephone numbers may be dialed.

In accordance with on embodiment of the invention, an indication of the selection of associated party identification data may be received. An indication of a request for associated information associated with the elected associated party identification data may be received. The requested associated information may be displayed.

BRIEF DESCRIPTION OF THE DRAWINGS

One or more embodiments of the invention and ways of making and using the invention, as well as the best mode contemplated of carrying out the invention, are described in detail below, by way of example, with reference to the accompanying drawings, in which:

FIGS. 13-21 illustrate the preferred embodiment of the display useful with the method of the invention.

DETAILED DESCRIPTION OF THE PREFERRED EMBODIMENTS

Figure 1:
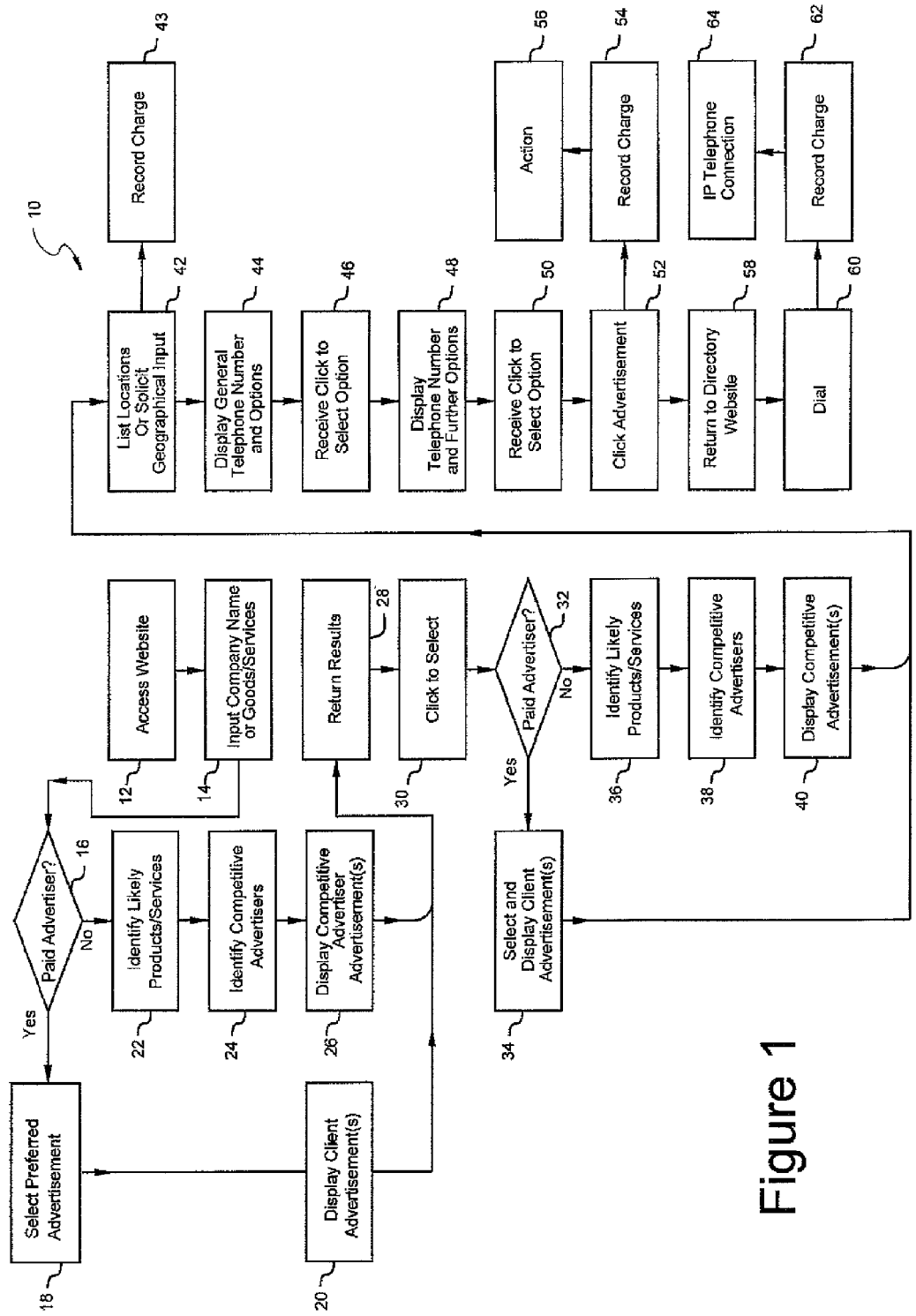
FIG. 1 is a flow chart generally illustrating a general implementation of the method of the present invention.
Figure 2:
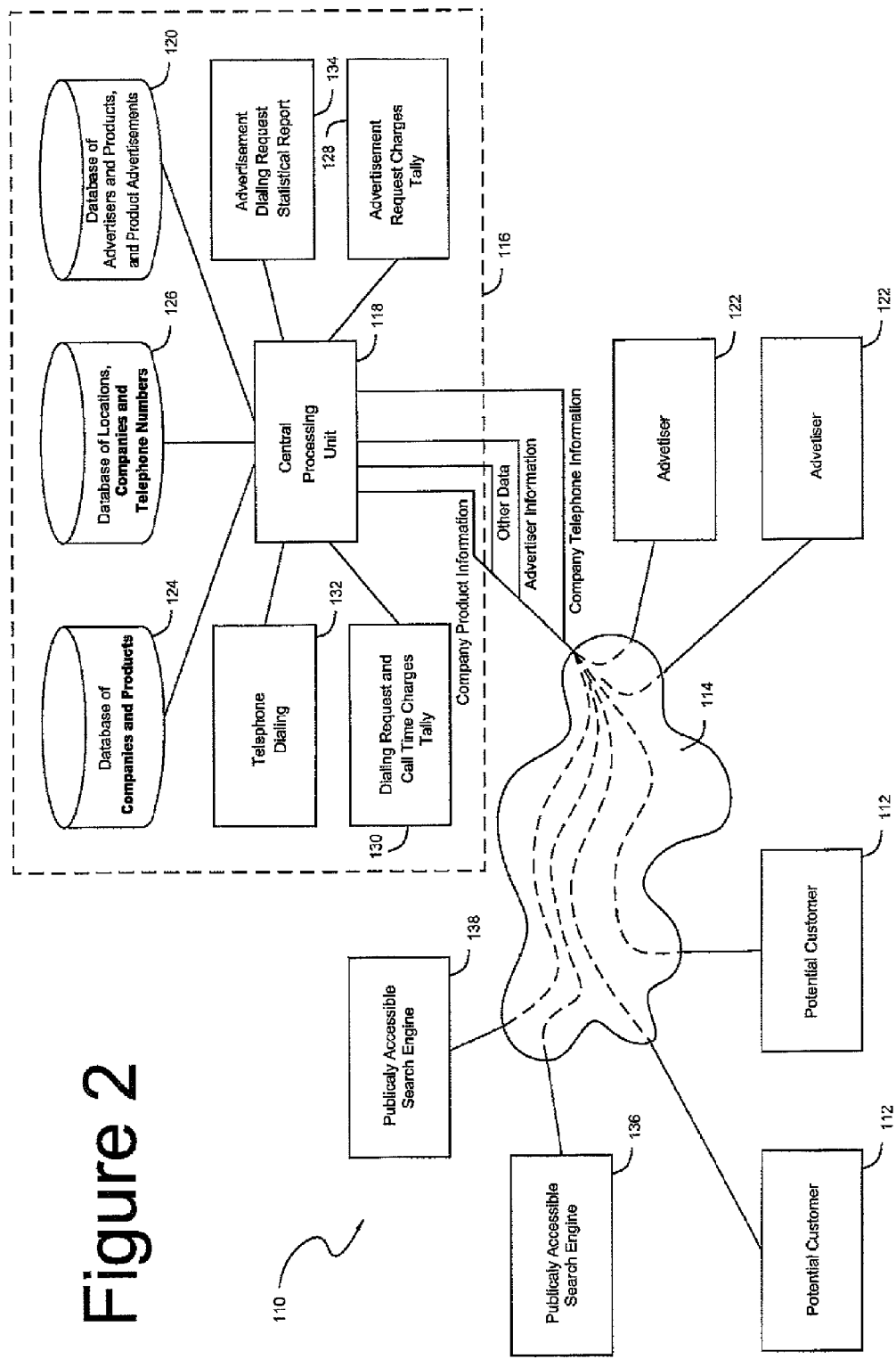
FIG. 2 is a block diagram of an apparatus for implementing an exemplary embodiment of the method according to the present invention.

Referring to FIG. 1, a block diagram of the method 10 of the present invention is illustrated. Where practical, numbering of elements in FIG. 1 is between 1 and 99 for purposes of clarity of explanation. FIG. 2 illustrates apparatus 110 for implementing the inventive method 10. Where practical, numbering of elements in FIG. 2 is between 100 and 199 for purposes of clarity of explanation. Method 10 is commenced by a potential customer 112 such as a potential customer 112 accessing the website at step 12. Such access is made by, for example, via the Internet 114.

FIGS. 3-11 illustrate screens presented to potential customer 112 over the Internet. These illustrated computer screens, for purposes of clarity of illustration, do not include conventional elements as are supplied, for example by an Internet browser, such as Microsoft Internet Explorer, or search engine websites such as Google. However, the same would appear on an actual computer screen implementing the invention. Where practical, numbering of elements in FIGS. 3 through 11 is between 200 and 299 for purposes of clarity of explanation.

Figures 3, 4:
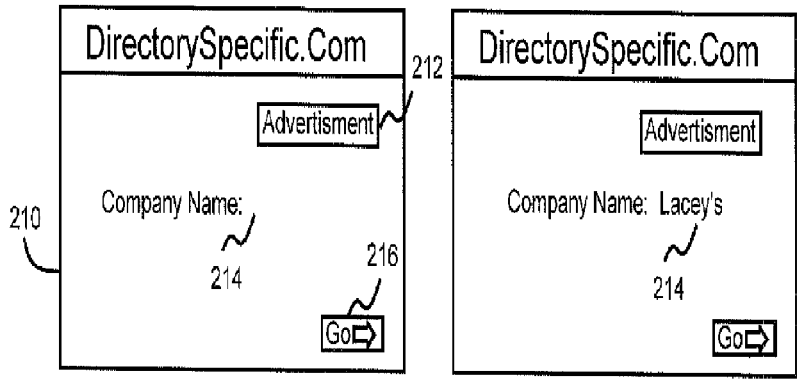
FIGS. 3-12 illustrate screens presented in accordance with the method of the present invention.

At step 12, in response to the potential customer 112 accessing the server system 116 of the company operating the inventive website, system 116 presents to potential customer 112 by sending over Internet 114 a screen 210, as shown in FIG. 3. Screen 210 may include an advertisement 212 from a sponsor company. In the present specification, in references made to any "Company" it is understood that the same may be a formal corporation, an individual operating a business, or the like.

Screen 210 may also include a field 214 for the entry at step 14 by potential customer 112 of the name of, for example, a store for which direct telephone number information is desired. Such a store may be an advertiser. In response to the query, "Company Name:", the potential customer 112 might type in the name of a store, for example, "Lacey's", as shown in FIG. 4. Screen 210 may also include an actuation icon or hyperlink 216. When the potential customer 112 completes typing in "Lacey's", icon 216 is clicked on with the mouse cursor positioned over icon 216.

Upon clicking, this information is sent via Internet 114 to server central processing unit 118, which is a conventional computer programmed to execute the method of the present invention. System 116 then proceeds to step 16, where central processing unit 118 consults database 120 to determine if the company name is associated with an advertiser or other sponsor 122 of the inventive website. If system 116 determines that the company sought is an advertiser, an advertisement 218 is selected by system 116 according to a request from sponsor 122 at step 18, and the selected advertisement 218, obtained from database 120, is sent by system 116 over the Internet at step 20 for display on the screen of FIG. 5. Generally, it is contemplated that many major commercial enterprises in an area will be sponsors of the inventive website. Consideration would be paid by sponsors to the operator of the website in exchange for the various advantages detailed herein.

If potential customer 112 has not identified an advertiser in field 214, system 116 proceeds to step 22, where central processing unit 118 consults database 124 to determine those products sold by the company whose name has been entered by potential customer 112 into field 214.

In this specification, in connection with references made to a "product", it is understood that the same refers to goods or services or any similar commodity which may be involved in commerce.

Database 124 contains a comprehensive list of companies in the region served by the inventive website, for example the United States. Database 124 also contains a list, for each of those companies, of the principal products sold by those companies. The same may be gathered by any number of various techniques. Based on this information and the name of the company name entered in field 214, at step 24, system 116 can determine which sponsor 122 or sponsors sell competitive products. At step 26, system 110 can display an advertisement or advertisements selected by the competitive sponsor 122 or sponsors contained in database 120. Such selection may be a function of the goods likely to be sold by the competitive company. In accordance with the invention, it is contemplated that database 124 may be populated by sponsors and/or by data assembling techniques, such as the making of manual telephone calls to principal advertisers likely to be searched for. It is also possible to generate information using web crawlers or the like. In connection with this, existing databases and search engines may be employed. In accordance with the invention it is contemplated that if an advertiser is being looked for, his name will appear. If the company being searched is not an advertiser, it is contemplated that advertisements of sponsor competitors will be displayed. If goods are being searched for, sponsors are given preferential treatment in the presentation of results. Otherwise, other indicators may be used to determine which company is displayed, for example the assumption may be made the companies most often searched for will be presented. Alternatively, a selection of such companies may be displayed. In accordance with the invention it is contemplated that to the extent that geographical information may be input into the system (in an appropriate field presented to the user/searcher by the inventive system) by the searcher, such information will be presented. To the extent that such information is available without searcher input, the same will determine results.

System 116 then proceeds to step 28, where system 116 presents to potential customer 112 response 220 to the query of potential customer 112. This response can include information on the search for company as well as competitor advertisements calculated to gain the interest of the searcher. Such response may be another query 222, "Location" and a field 224 to receive the location of the store on which potential customer 112 is seeking information. Potential customer 112 then fills in his location (causing the system to present information on the store closest to the customer's location) and then clicks on icon 216 at step 30, causing system 116 to proceed to step 32 and determine if the selected company is an advertiser. At the same time the potential customer 112 may be sent locations of the closest stores as illustrated in FIG. 6, as a result of central processing unit 118 consulting database 126.

Figures 5, 6:
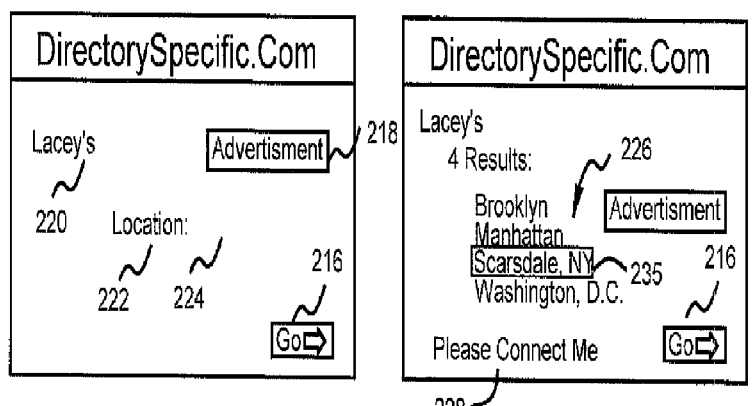

If potential customer 112 has selected an advertiser (for example in response to a query respecting goods), an advertisement 218 is selected by system 116 according to a request from sponsor 122 at step 34, and the selected advertisement 218, obtained from database 120, is sent by system 116 over the Internet, also at step 34, for display on the screen of FIG. 5.

If potential customer 112 has not identified an advertiser/sponsor in field 214, system 116 proceeds to step 40, where central processing unit 118 consults database 124 to determine those products sold by the company whose name has been entered by potential customer 112 into field 214. Based on this information and the name of the company, entered in field 214, at step 38, system 116 can determine which sponsor 122 or sponsors sell competitive products. At step 40, system 116 can display an advertisement or advertisements selected by the competitive sponsor 122 or sponsors contained in database 120.

After the potential customer 112 enters a desired location into field 224 on the screen illustrated in FIG. 5, system 116 proceeds to step 42, and consults database 126 and compares locations in the database to the requested location. System 116 them lists the closest locations 226 in the screen of FIG. 6. This also results in the recordal of a charge to the advertiser at step 43. In accordance with the invention it is contemplated that each time an advertisement presented by an advertiser is clicked on, a charge is recorded. These charges are then accumulated and sent to advertiser's monthly. It is also contemplated in accordance with the invention that if there are no results for a search for company which is not a sponsor within a certain mileage range, system 116 may so inform potential customer 112 and produce sponsor 122 information, but give the option of store locations at greater distances.

Alternatively, instead of the screen of FIG. 5, system 116 can go directly to FIG. 6 with the list of locations. Alternatively, telephone numbers may be provided for each location at step 44. In either case, potential customer 112 may click icon 228 and place a call from his computer, with telephone service being provided by the operator of the inventive website or the regular provider to potential customer 112. Alternatively, potential customer 112 may place a call using a cellular telephone or other telephone service and manually dialing the number. Such function may also be provided by central processing unit 118. In addition, other services, such as Skype may be used.

Figures 7, 8:
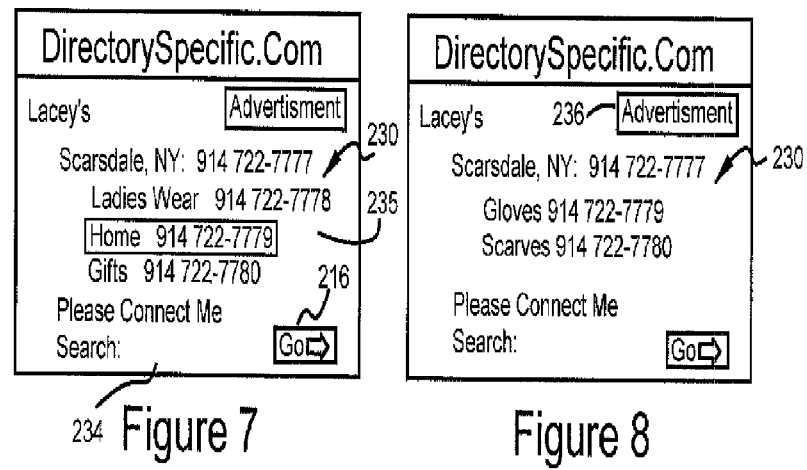

Referring to FIG. 6, at step 46 potential customer 112 may click on a desired location (causing it to be highlighted, as illustrated in FIG. 6) and click on icon 216 or double click on a desired location to actuate a subcategory information retrieval. This actuation is sent over the Internet to central processing unit 118, which searches database 126 and produces a list of departments for the selected location, together with telephone numbers for all displayed locations and general departments, as illustrated in FIG. 7. The result is a listing of the various categories of products in the store and the department telephone numbers at step 48.

As illustrated in FIG. 7, a department, such as "Ladies Wear" may be highlighted 235 by potential customer 112 at step 50, and the "Please Connect Me" icon can be highlighted, as illustrated. The display also includes an advertisement 236. Potential customer 112 may click on advertisement 236 at step 52. This results in the recordal of a charge to the advertiser at step 54. This is done by system 116 by recording a charge in register 128. System 116 then proceeds at step 56 to respond to the clicking on the advertisement, for example by the transfer of potential customer 112 to a particular page on the web site of the advertiser.

After acting on the selection of the advertisement, potential customer 112 may return to the web site at step 58. The potential customer 112 may then highlight the department and telephone number and may then be automatically connected by having thus caused system 116 to dial at step 60. Charges for dialing are recorded in registry 130 at step 62. More particularly, the objective is to charge sponsors for each telephone call placed to them. In this way the inventive system enables potential customers to initiate voice contact with the proper department at a particular store which they initially input into the system or to which they were led by the system. At step 64, system 116 implements connection of the potential customer 112 through module 132.

Such connection may be done in one of two ways. Either connection can be made through a telephone connection provided by the web site operator (with the advantage of charging an advertiser for minutes of usage), or in the computer of potential customer 112 may be caused to use the Internet connection of potential customer 112. Other methods may also be used.

A yet further alternative is to provide the option of direct connection only for advertisers, as contractual relations with such advertisers can provide for payment, while providing connection to all parties will not cover costs of making connections through the web site, which may provide for a simpler execution of the function. In this respect it is possible to present the alternative of direct connection via the search website to the advertiser, based on the most up-to-date estimation of the types of products or services being sought by the potential consumer. More particularly, if the consumer wishes to dial a non-sponsor/advertiser, he may be required to use his own telephone account and make a separate entry of the telephone number. On the other hand, the consumer can simply click on the sponsor's name or department and the connection can be made to the computer immediately and the potential customer may simply talk to a microphone connected to his computer and listen to the other side of the conversation using the speaker on the computer.

Optionally, a search field 234 may be provided to receive a search input. For example, potential customer 112 may input the search term "cold weather" into field 234, and then click on icon 216, causing the system 116 to return the screen of FIG. 8. As shown in FIG. 8, the system 116 discloses they number of products which are responsive to the search query input into the system 116 in FIG. 7, as described above but not illustrated in FIG. 7. The screen illustrated in FIG. 8 also provides for the possibility of further search queries. Optionally, such search fields and functions may be provided in any of the system 116 screens together with descriptive material, if desired.

Figure 9:
Figure 10:
Figure 11:

In similar fashion, simply clicking on the "Home" can cause system 116 to connect the potential customer 112 to the selected department. This causes system 116 to return to database 126 to look at categories under "Horne", causing system 116 to go to the screen of FIG. 9. As shown in FIG. 9, such actuation results in the display of additional departments, namely, "Bath" and "Dining".

In similar fashion, simply double-clicking on "Home" can cause system 116 to connect the potential customer 112 to the selected department. Alternatively, this may be made to cause system 116 to return to database 126 to look at categories under "Home", causing system 116 to return the screen of FIG. 9. As shown in FIG. 9, such actuation results in the display of additional departments, namely, "Bath" and "Dining".

In accordance with the invention, it is also contemplated that the system 116 will produce statistical reports on potential customers 112, for example reports which are accessible over the Internet, by accumulating data in register 134.

In accordance with the present invention, it is further contemplated that data respecting advertisers is gathered from advertisers directly.

In the case of companies which are not advertisers, company name, product and telephone information may be collected through publicly accessible search engines 136 and 138, such as Google. In addition, telephone calls placed by the system 116 to prior art telephone voice tree answered systems 116 may be used to gather department, subdepartment, category and subcategory information. This may be done by human operators, or, alternatively, an automated system 116 may navigate existing telephone voice trees using voice recognition software and ask automated questions generated using voice synthesis technology.

Figure 12:

Still yet another possibility for a screen display is illustrated in FIG. 12. In this example, the number is not automatically displayed. Instead, an icon 238 allows potential customer 112 to request the telephone number while another icon 240 allows the potential customer 112 to simply request connection.

In accordance with the present invention, and in the case where a telephone connection is provided by the operator of the inventive web site, for example, for telephone calls only to paying advertisers, the opportunity exists to provide an opening message prior to placement of the call. Such opening message may only be provided while the potential customer 112 is waiting for a telephone receiver to be answered. In this case, the circumstance may be explained to potential customer 112.

Figure 13:
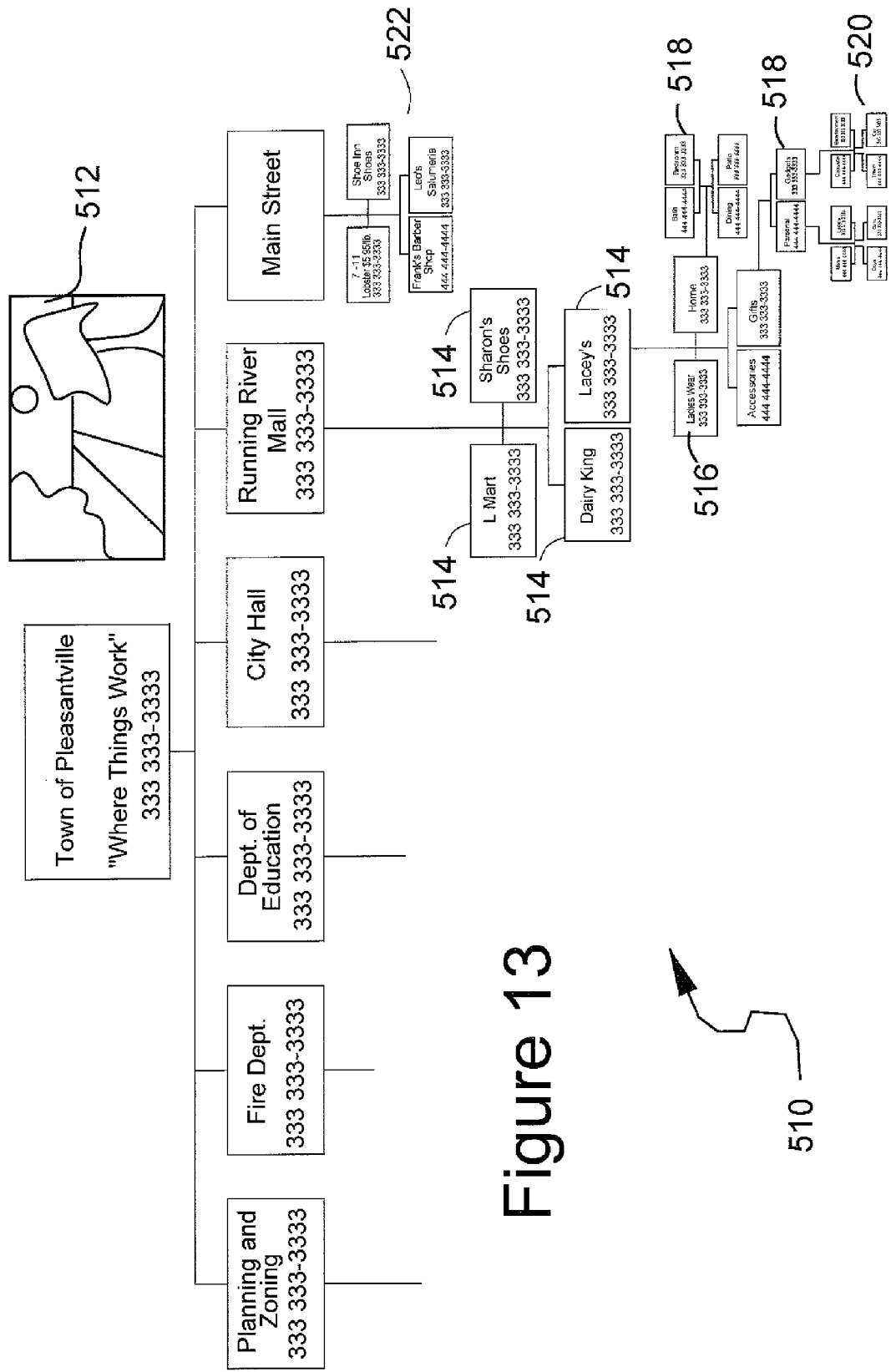

Referring to FIG. 13, a particularly useful embodiment of the system of the present invention is illustrated. Generally, information is provided in the form of a map with various divisions associated in the display with their respective telephone numbers. Conceptually, larger divisions are shown in larger type. As information becomes more granular, the size of the associated graphics is reduced. This allows the user to see the high points of the organization and then use the computer to see more granular information by, for example, clicking on difficult to read information to increase display alphanumeric size, zooming with the mouse, picking a center point and zooming on it, selecting a zoom function and then clicking on the center point and so forth.

In accordance with the invention, such differences in size may be set as varying from one discrete value to another, for example decreasing in size by 33⅓% or increasing in size by 50%. Sizes of alphanumeric displays in different parts of the display may also be varied in the same manner, thus providing for uniform font size for all parts of the display at some level of zoom. In addition, the power of the zoom in/zoom out function may be keyed to the same increase and decrease, thus allowing all functions to track each other and give a uniform display.

An alternative implementation is to have variable levels of zoom which may be implemented by the user depressing the control key and either using the scroll portions of a touchpad or a conventional mouse wheel to implement a variable zooming function.

Also in accordance with the invention, different gestures or keyboard keys may be used to control the display. For example, a single click may cause the display to zoom away, while double-clicking may cause the display to zoom in on parts of the display showing greater levels of granularity. Optionally, zoom in or zoom out commands may result in images centered on the position of click or double-click cursor locations during the time of clicking or double-clicking. Alternatively, the system may present a predetermined display in response to clicking within a particular defined area, for example during zooming in.

Referring to FIG. 13, a town, such as the town of Pleasantville, may provide a website display 510 for providing the telephone numbers of its various departments and other attractions. At the very highest level this could be an advertisement 512, which may be attractive pictures, video, text, or the like in a designated area.

Increasing levels of granularity are displayed in the form of three departments of the city, city hall, a mall and the Main Street shopping area. Each has its own telephone number (many shown with the same number for purposes of simplicity of illustration in this application, but all of which would probably have different numbers in a real world application). Main Street has no number because it likely would not have a central marketing office. On the other hand, the "Running River Mall" does have its own number for marketing purposes.

As can be seen from FIG. 13, stores in the Main Street area would appear underneath Main Street. Similarly, retailers 514 in the Running River Mall would appear under that mall. Going to a greater level of granularity, departments 516 of one store, Lacey's appear in smaller type and sub-departments 518 in yet smaller type while their sub-sub-departments 520 are in even smaller type.

In accordance with the invention, a user may zoom in on a particular region, such as the region 522 which, in the example, includes the retailers in the Main Street area of Pleasantville. A double click may be used to instruct the system to zoom in, while a single click may be used to cause the system to zoom out. Thus, double-clicking on region 522 will cause the system to output the display of FIG. 14. Other functionalities may also be included. For example, if the mouse is moved to the left, the region to the left of the display may be displayed. The opposite occurs when the mouse is moved to the right, and movement of the mouse up and down causes corresponding movement in the display.

In accordance with the invention, if the mouse is not moved, the system may be programmed so that the display area shown stops displaying lines connecting to other parts of the map, as is the case in FIG. 14. In addition to this, the cessation of movement may also trigger the download of graphic or other information, such as video, audio and so forth. On the other hand, if one begins to move the mouse, connection lines between different items may be restored to the display.

Figure 15:
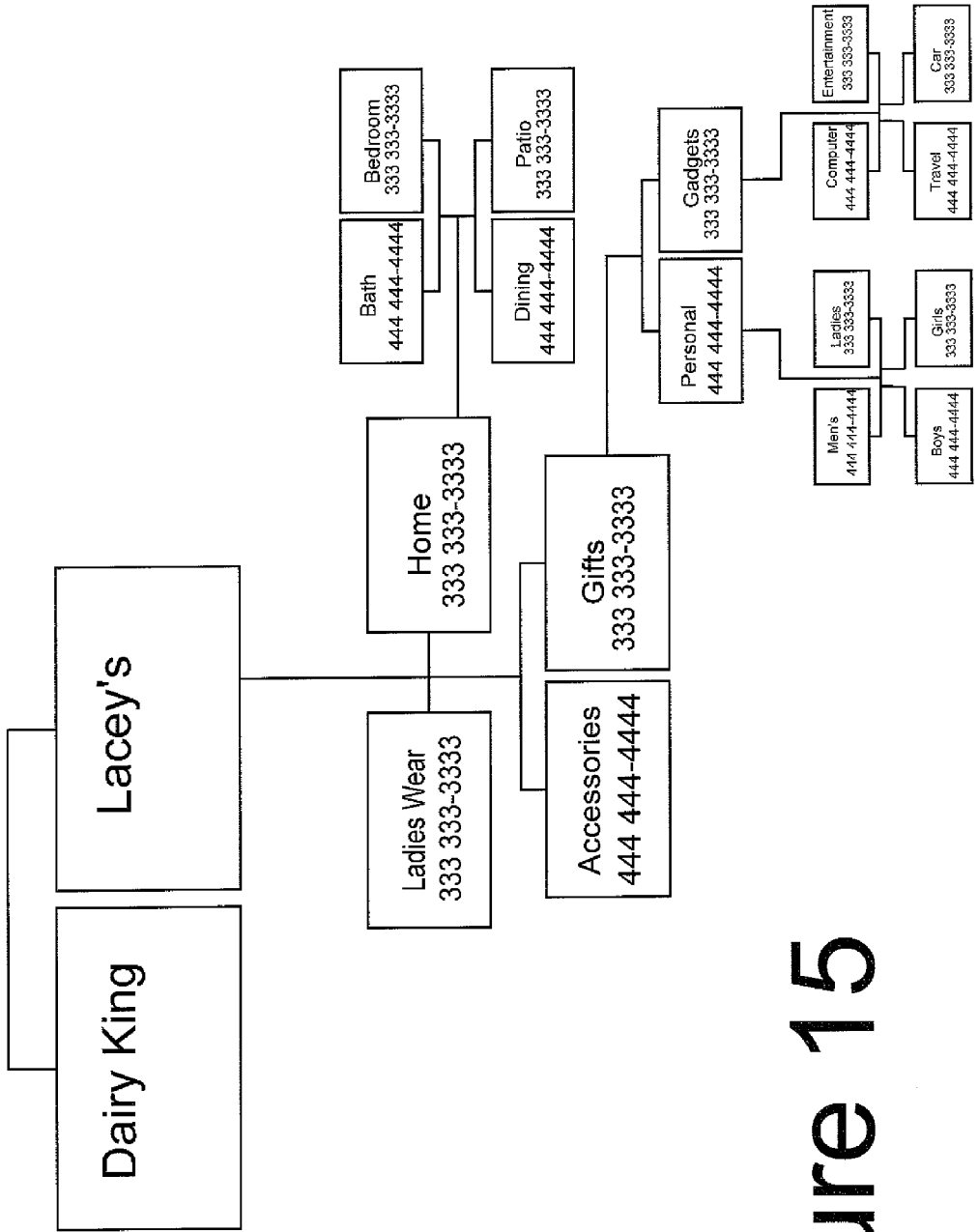

As can be seen from FIG. 15, the relationship in size between different levels of granularity is one of a 50% gain in size when zooming in and a 33⅓% loss in size when zooming out.

Figure 16:
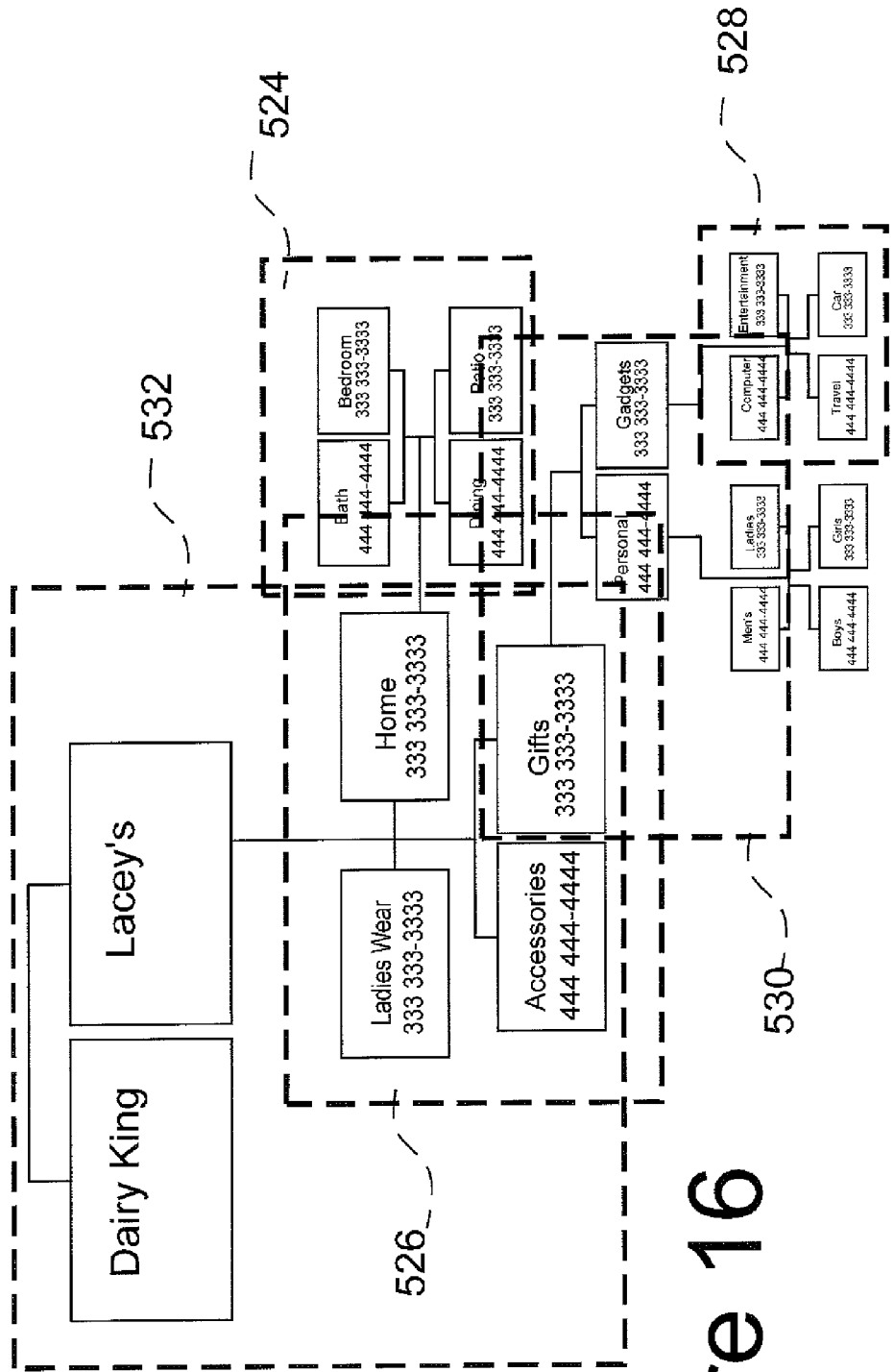
Figure 18:
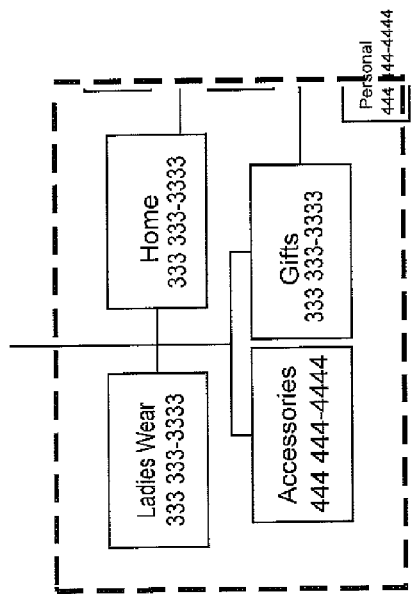
Figure 17:
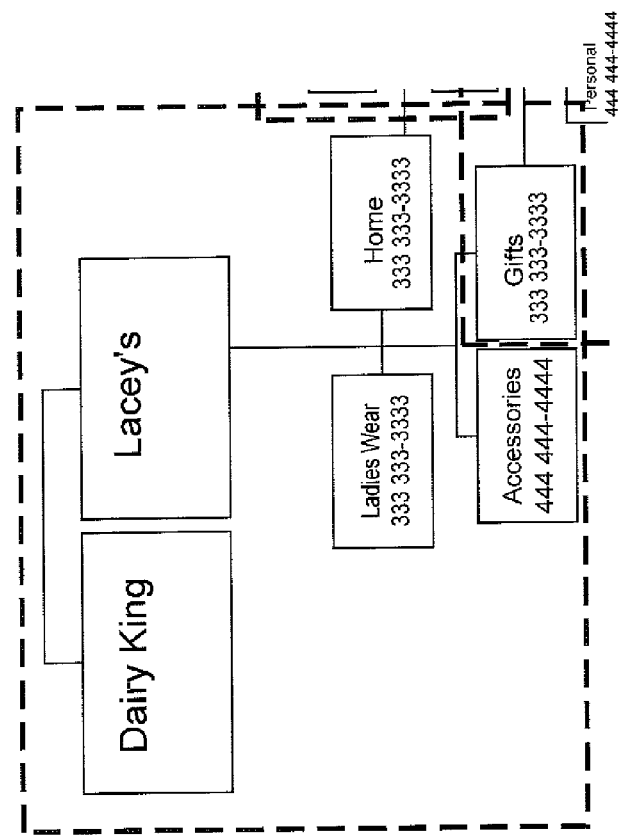
Figure 19:
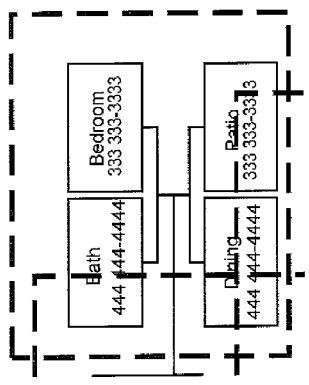
Figure 20:
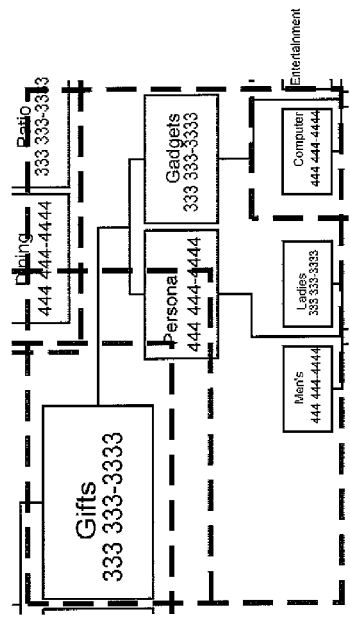
Figure 21:
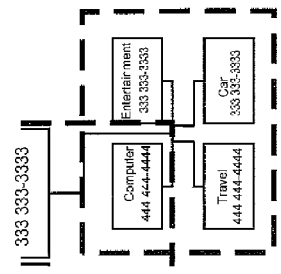

Referring to FIG. 16, yet another embodiment of the present invention is illustrated. In this embodiment, the system is preprogrammed with regions 524 through 532. In this example, each region is defined as a rectangle. Each rectangle has a center, or rectangle region centerpoint, not illustrated. In accordance with this embodiment, clicking on the drawing with a single click causes the display of the rectangle region associated with the nearest rectangle region centerpoint. Double-clicking causes zooming in and triple clicking causes zooming out. Simple movement of the mouse may be used to move the display, or a click and drag movement may be employed for the same purpose. If the mouse is not moved for a period of time, for example 2 seconds, connections to other regions cease to be displayed and additional or different material may be downloaded.

It is also possible to use gestures of the type used in the Apple iPhone or other gestures to control the display in accordance with the present invention.

As illustrated in FIGS. 17-21, clicking on different regions will cause displays such as those illustrated in the figures to be presented on the screen of the computer, with different regions of different sizes being sized properly to fill the computer screen. For example, each of the FIGS. 17-21 may, in accordance with the preferred embodiments, represent a full screen display.

Further in accordance with the present invention, the system may detect the point of interest, for example based on cursor movement, for example stopping or slowing down for an extended period of time and hen zoom in or zoom out, optionally slowly, to a magnification appropriate to allow the viewer to easily view the information, but allowing the user to override the automatic zooming feature. Such automatic zooming is not resumed until certain conditions are met, for example, resumed substantial mouse movement (i.e. including touchpad or other pointing device movement).

Figure 22:
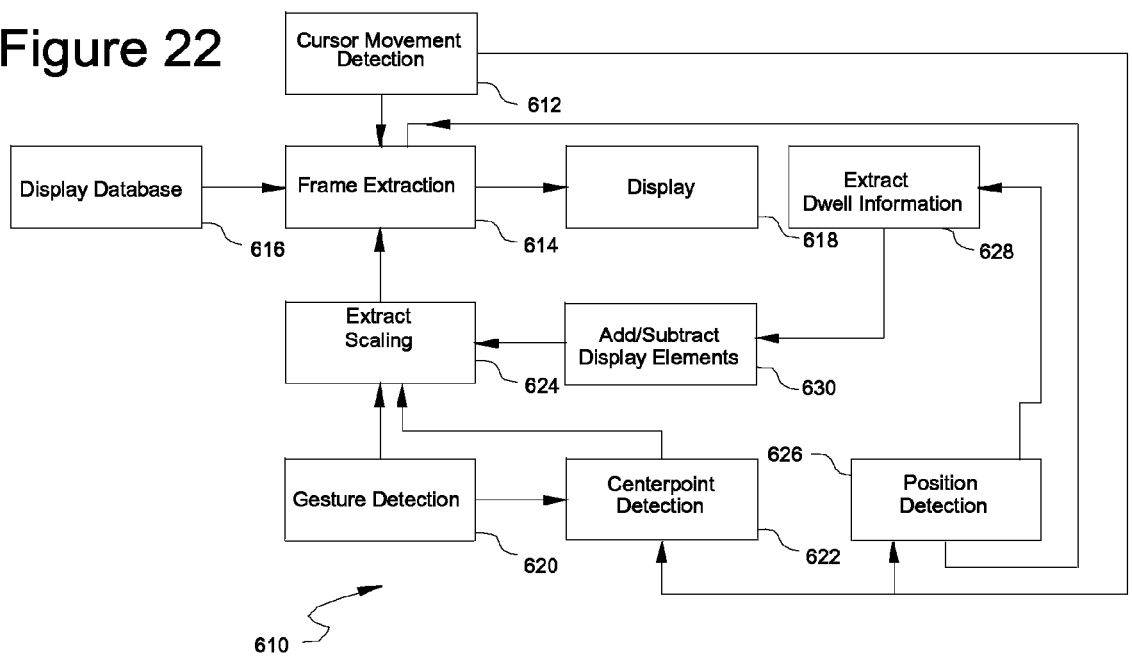
FIG. 22 illustrates the software for implementing the methodology of the invention on a personal computer.

Referring to FIG. 22, a flowchart for software for performing the method of the present invention as outlined in FIGS. 13-21 is illustrated. Generally, the software 610 detects cursor movement at step 612. This information, in the simplest case, results in a determination of frame content at step 614 where the system derives information from database 616. This, in turn, drives the display of the computer at step 618.

More complex functions are determined by gestures, single clicking, double-clicking, triple clicking and so forth. Such gestures are detected at step 620. If the gestures indicate that centerpoint detection is appropriate in order to reduce the display of a predetermined region, the system detects the predetermined gesture at step 622, causing the system to determine scaling at step 624. The system may also be responsive to gestures detected at increase or decrease scaling. In connection with this, the position of the cursor is detected at step 626, which information may be used to extract the frame at step 614, or to determine at step 628 that the cursor is dwelling for a period of time in an area, causing the system to add or subtract display elements to simplify the display at step 630. Alternatively, the system may go to a predefined area display, begin the download of video or other advertising material, or make a centerpoint determination at step 622.

While an illustrative embodiment of the invention has been described, it is understood that some variations and equivalents are within the scope of the invention which is defined by the claims and their elements, including equivalents thereof.

The invention claimed is:

1. A method of displaying a directory of information elements, comprising displaying said directory of information elements with a configuration which is humanly perceptible but with a size that may not be humanly discernible, wherein elements are divided into at least first, second and third tiers of information, said first, second and third tiers of information being displayed simultaneously, said first tier of information being displayed in a first size, said second tier of information being displayed in a second size smaller than said first size, and said third tier of information being displayed in a third size smaller than said second size, said information elements each comprising an identification subelement and an address subelement wherein a user may drag the display to reveal other parts of the display.

2. A method as in claim 1, wherein gesturing on an address implements or begins to implement a connection to said address.

3. A method as in claim 1, wherein gesturing on an address implements or begins to implement a connection to said address, and wherein gesturing, using a gesture selected from the group consisting of clicking, sweeping or operation of a displayed toolbar, on an area other than an address with a first gesture causes zooming in on said display, and gesturing with a second gesture selected from said group causes zooming out from information on said display.

4. A method as in claim 1, wherein lingering with a cursor on a particular location in the display causes a simplification of the display by the removal of information such as links to other areas of the display, and movement of said cursor causes restoration of removed information to the display.

5. A method as in claim 1, wherein lingering with a cursor on a particular location in the display causes a magnification of the display, and movement of said cursor causes restoration of the size of the display.

6. A method as in claim 1, wherein gesturing on an address implements or begins to implement a connection to said address and, wherein gesturing on an address implements or begins to implement a connection to said address, and wherein gesturing, using a gesture selected from the group consisting of clicking, sweeping or operation of a displayed toolbar, on an area other than an address with a first gesture causes zooming in on said display, and gesturing with a second gesture selected from said group causes zooming out from information on said display.

7. A method as in claim 6, wherein lingering with a cursor on a particular location in the display causes a simplification of the display by the removal of information such as links to other areas of the display, and movement of said cursor causes restoration of removed information to the display, and wherein lingering with a cursor on a particular location in the display causes a magnification of the display, and movement of said cursor causes restoration of the size of the display.

8. A method of displaying a directory of information elements, as in claim 1, wherein said identification subelement comprises a source of a merchandise or service and said address subelement comprises an address taken from he group consisting of telephone numbers and internet addresses.

9. A method of displaying a directory of information elements as in claim 1, wherein at least one of said information elements further comprises a video element.

10. A method of displaying a directory of information elements, as in claim 1 wherein said identification subelement comprises a source of a merchandise or service and said address subelement comprises an address taken from the group consisting of telephone numbers and internet addresses.

11. A method as in claim 1 wherein said information elements are associated with regions and each of said regions has an associated region trigger point with a position in said region, and gesturing at a clicking point, for example by clicking, on the display causes the display of the region associated with the trigger point closest to said clicking point.

12. A method of displaying a directory of information elements, comprising displaying said directory of information elements with a configuration which is humanly perceptible but with a size that may not be humanly discernible, wherein elements are divided into at least two tiers of information, said tiers of information being displayed simultaneously, said tiers of information being displayed in varying sizes said information elements each comprising an identification subelement and an address subelement wherein a user may drag the display to reveal other parts of the display.

13. A method as in claim 12 wherein said tiers of information are divided into at least first, second and third tiers of information, said first, second and third tiers of information being displayed simultaneously, said first tier-of information being displayed in a first size, said second tier of information being displayed in a second size smaller than said first size, and said third tier of information being displayed in a third size smaller than said second size.

14. A method of displaying a directory of information elements, comprising displaying said directory of information elements wherein elements are divided into at least first, second and third tiers of information, said first, second and third tiers of information being displayed simultaneously, said first tier-of information being displayed in a first size, said second tier of information being displayed in a second size smaller than said first size, and said third tier of information being displayed in a third size smaller than said second size, said tiers of information being displayed simultaneously, and said information elements each comprising a plurality of subelements.

15. A method as in claim 14 wherein said subelements comprise an identification subelement and an address subelement wherein a user may drag the display to reveal other parts of the display.

* * * * *